US012638682B2

(12) United States Patent (10) Patent No.: US 12,638,682 B2

Shah et al. (45) Date of Patent: May 26, 2026

(54) SYSTEMS WITH SUPPLEMENTAL ILLUMINATION

(71) Applicant: Apple Inc., Cupertino, CA (US)

(72) Inventors: Ritu Shah, Sunnyvale, CA (US);
Edward S. Huo, Sunnyvale, CA (US);
Jason L. Slupeiks, Sunnyvale, CA
(US); Ryan J. Dunn, Santa Cruz, CA
(US); Tom Sengelaub, Oakland, CA
(US); Tong Chen, Fremont, CA (US)

(*) Notice: Subject to any disclaimer, the term of this
patent is extended or adjusted under 35
U.S.C. 154(b) by 577 days.

(21) Appl. No.: 18/179,899

(22) Filed: Mar. 7, 2023

(65) Prior Publication Data

US 2023/0324690 A1 Oct. 12, 2023

Related U.S. Application Data

(63) Continuation of application No.
PCT/US2021/047613, filed on Aug. 25, 2021.

(60) Provisional application No. 63/081,204, filed on Sep.
21, 2020.

(51) Int. Cl.
G02B 27/01 (2006.01)
G02B 27/00 (2006.01)

(52) U.S. Cl.
CPC ..... G02B 27/0172 (2013.01); G02B 27/0093
(2013.01); *G02B 2027/0138* (2013.01); *G02B*
*2027/014* (2013.01)

(58) Field of Classification Search
CPC ............ G02B 27/0172; G02B 27/0093; G02B
27/017; G02B 2027/014; G02B
2027/0178; G02B 2027/0138
See application file for complete search history.

(56) References Cited

U.S. PATENT DOCUMENTS

| | | | |
|---|---|---|---|
| 6,097,353 A * | 8/2000 | Melville | .............. G02B 27/017 |
| | | | 345/9 |
| 9,140,444 B2 | 9/2015 | Connor | |
| 9,384,594 B2 | 7/2016 | Maciocci et al. | |
| 9,400,390 B2 | 7/2016 | Osterhout et al. | |
| 9,459,758 B2 | 10/2016 | Berenson et al. | |
| 9,995,936 B1 | 6/2018 | Macannuco et al. | |
| 10,598,936 B1 * | 3/2020 | Berkovich | ............. H04N 25/77 |

(Continued)

FOREIGN PATENT DOCUMENTS

| | | |
|---|---|---|
| KR | 100518250 B1 | 10/2005 |
| KR | 20160135660 A | 11/2016 |

*Primary Examiner* — Xuemei Zheng

(74) *Attorney, Agent, or Firm* — Treyz Law Group, P.C.;
Kendall P. Woodruff

(57) ABSTRACT

A head-mounted device may have a head-mounted support
structure. Displays may present images to eye boxes at the
rear of the head-mounted support structure. Cameras and
other sensors may be supported by the head-mounted sup-
port structure. Tracking cameras may be used to track the
movement of a user's hands or other external objects. In dim
ambient lighting conditions, a supplemental illumination
system may be activated to provide supplemental illumina-
tion for the tracking cameras. A single beam of supplemental
illumination may be emitted over a given coverage area or
a smaller beam of supplemental illumination may be steered
across the given coverage area. Light-emitting devices such
as infrared light-emitting diodes and infrared lasers may be
used to form infrared light sources for the supplemental
illumination system.

20 Claims, 8 Drawing Sheets

(56) References Cited

U.S. PATENT DOCUMENTS

| | | | |
|---|---|---|---|
| 2013/0342568 A1 | 12/2013 | Ambrus et al. | |
| 2014/0125579 A1 | 5/2014 | Yamamoto | |
| 2017/0307880 A1 | 10/2017 | Shrubsole et al. | |
| 2018/0082482 A1* | 3/2018 | Motta | G02B 27/0093 |
| 2018/0182173 A1* | 6/2018 | Robaina | G06T 19/006 |
| 2018/0249561 A1 | 8/2018 | Recker et al. | |
| 2019/0297312 A1* | 9/2019 | Price | G02B 27/0093 |
| 2019/0297316 A1* | 9/2019 | Bleyer | G06T 19/006 |
| 2020/0098335 A1 | 3/2020 | Chen et al. | |
| 2021/0373336 A1* | 12/2021 | Price | G02B 27/0172 |

* cited by examiner

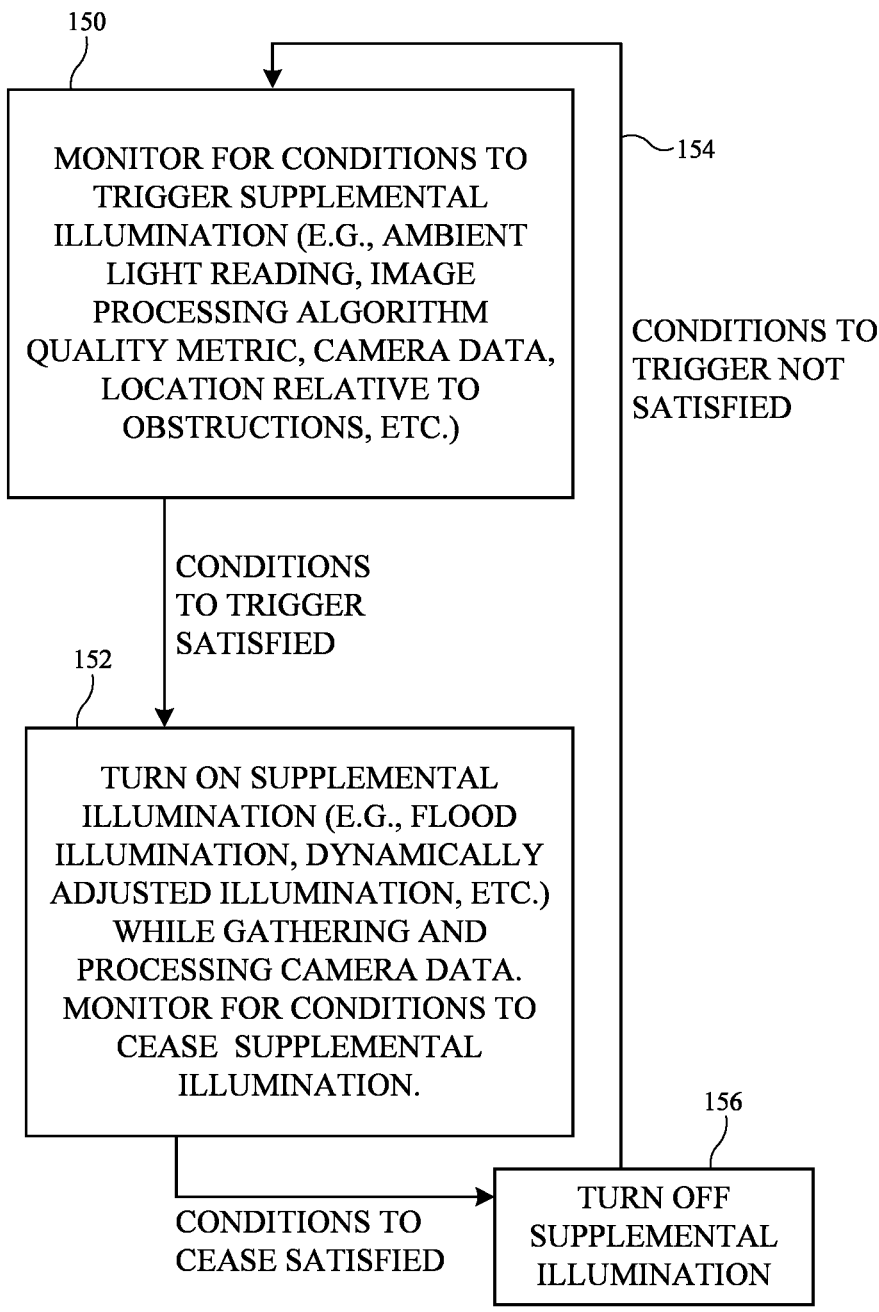

150

MONITOR FOR CONDITIONS TO TRIGGER SUPPLEMENTAL ILLUMINATION (E.G., AMBIENT LIGHT READING, IMAGE PROCESSING ALGORITHM QUALITY METRIC, CAMERA DATA, LOCATION RELATIVE TO OBSTRUCTIONS, ETC.)

154

CONDITIONS TO TRIGGER NOT SATISFIED

CONDITIONS TO TRIGGER SATISFIED

152

TURN ON SUPPLEMENTAL ILLUMINATION (E.G., FLOOD ILLUMINATION, DYNAMICALLY ADJUSTED ILLUMINATION, ETC.) WHILE GATHERING AND PROCESSING CAMERA DATA. MONITOR FOR CONDITIONS TO CEASE SUPPLEMENTAL ILLUMINATION.

156

CONDITIONS TO CEASE SATISFIED

TURN OFF SUPPLEMENTAL ILLUMINATION

*FIG. 12*

SYSTEMS WITH SUPPLEMENTAL ILLUMINATION

This application is a continuation of international patent application No. PCT/US2021/047613, filed Aug. 25, 2021, which claims priority to U.S. provisional patent application No. 63/081,204, filed Sep. 21, 2020, which are hereby incorporated by reference herein in their entireties.

FIELD

This relates generally to electronic devices, and, more particularly, to electronic devices such as head-mounted devices.

BACKGROUND

Electronic devices such as head-mounted devices may have sensors. For example, a head-mounted device may have a camera for capturing images of the environment surrounding the head-mounted device.

SUMMARY

A head-mounted device may have a head-mounted support structure. Displays may present images to eye boxes at the rear of the head-mounted support structure.

Cameras and other sensors may be supported by the head-mounted support structure. During operation, camera images and other sensor data may be gathered and processed by control circuitry in the head-mounted device.

One or more cameras may be used to track the movement of a user's hands or other external objects. In bright ambient lighting conditions, the cameras may capture visible light images. In dim ambient lighting conditions, a supplemental infrared illumination system may be activated to provide supplemental illumination for the tracking cameras.

The supplemental illumination system may have fixed and/or dynamically adjustable light sources. A relatively large beam of supplemental illumination may be emitted over a desired coverage area or a smaller beam of supplemental illumination may be steered across the desired coverage area.

Light-emitting devices such as infrared light-emitting diodes and infrared lasers may be used to form the infrared light sources for the supplemental illumination system. Adjustable light sources may have individually addressable light-emitting components that emit light in different respective directions or may use electrically adjustable beam steerers to control the direction of emitted light.

BRIEF DESCRIPTION OF THE DRAWINGS

FIG. 12 is a flow chart of illustrative operations involved in using an electronic device such as a head-mounted device with a supplemental illumination system in accordance with an embodiment.

DETAILED DESCRIPTION

Head-mounted devices include head-mounted support structures that allow the devices to be worn on the heads of users. Displays may be used for presenting a user with visual content. Cameras may be used to capture visible light and infrared images. Cameras may be used, for example, to track hand gestures and other body movements, to provide a user with real-time pass-through video, and to track movement of the head-mounted device relative to the environment surrounding the head-mounted device.

A head-mounted device may be used in low-light situations. To ensure adequate illumination in these situations, supplemental illumination may be provided by a supplemental illumination system in the head-mounted device. The illumination system may provide illumination that helps cameras in the head-mounted device operate properly even in the absence of adequate ambient light.

To help prevent the creation of visual distractions for people in the vicinity of a head-mounted device, a supplemental illumination system may operate at infrared wavelengths. Cameras in the head-mounted device may be configured to sense both visible and infrared light. When visible ambient light levels are low, the illumination system may supply infrared illumination while the cameras gather infrared images. If desired, the direction and/or power level of the infrared illumination may be adjusted.

Figure 1:
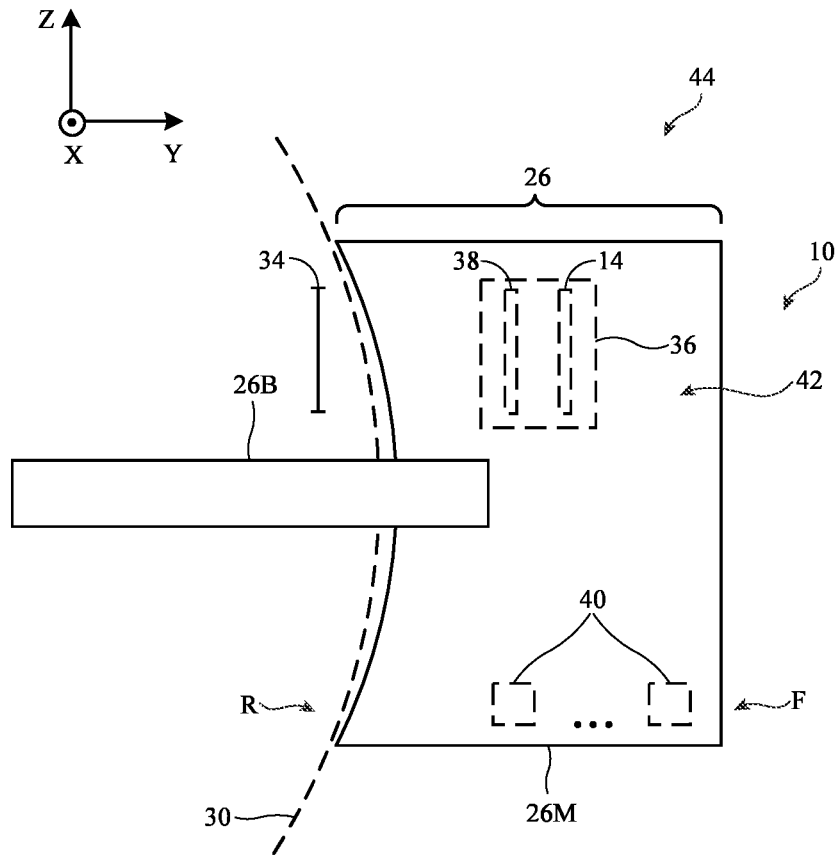
FIG. 1 is a side view of an illustrative electronic device such as a head-mounted device in accordance with an embodiment.

FIG. 1 is a side view of an illustrative head-mounted electronic device of the type that may be provided with an illumination system. As shown in FIG. 1, head-mounted device 10 may include head-mounted support structure 26. Support structure 26 may have walls or other structures that separate an interior region of device 10 such as interior region 42 from an exterior region surrounding device 10 such as exterior region 44. Electrical components 40 (e.g., integrated circuits, sensors, control circuitry, light-emitting diodes, lasers, and other light-emitting devices for an illumination system, other control circuits and input-output devices, etc.) may be mounted on printed circuits and/or other structures within device 10 (e.g., in interior region 42).

To present a user with images for viewing from eye boxes such as eye box 34, device 10 may include displays such as display 14 and lenses such as lens 38. These components may be mounted in optical modules such as optical module 36 (e.g., a lens barrel) to form respective left and right optical systems. There may be, for example, a left display for presenting an image through a left lens to a user's left eye in a left eye box and a right display for presenting an image to a user's right eye in a right eye box. The user's eyes are located in eye boxes 34 at rear side R of device 10 when structure 26 rests against the outer surface (face surface 30) of the user's face.

Support structure 26 may include a main support structure such as main housing portion 26M (sometimes referred to as a main portion). Main housing portion 26M may form front side F of device 10. On rear side R, main housing portion 26M may have cushioned structures to enhance user comfort as portion 26M rests against face surface 30. If desired, support structure 26 may include optional head straps such as strap 26B and/or other structures that allow device 10 to be worn on a head of a user.

Figure 2:
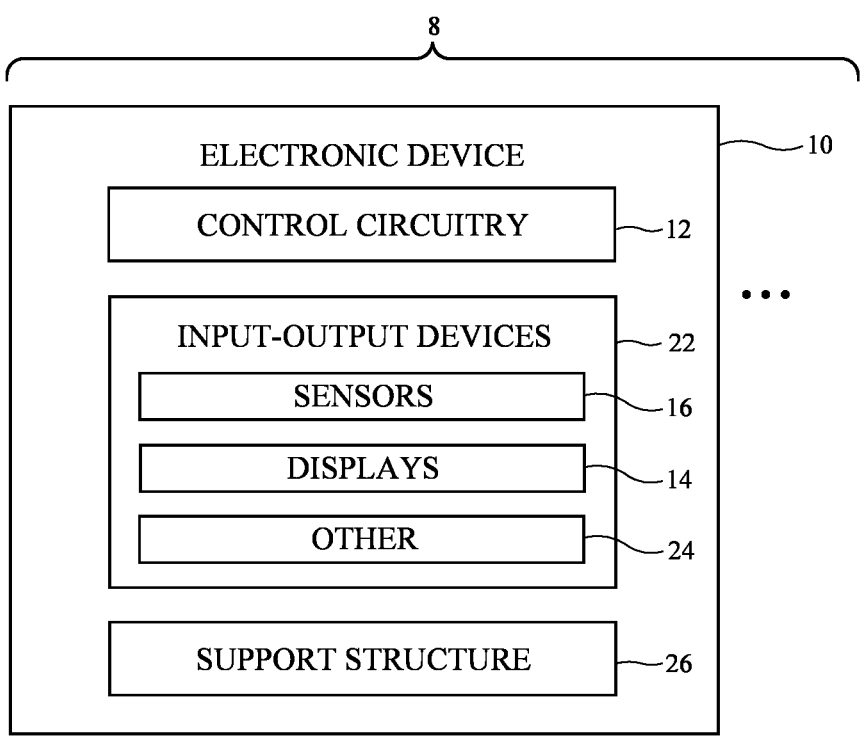
FIG. 2 is schematic diagram of an illustrative system with an electronic device in accordance with an embodiment.

A schematic diagram of an illustrative system that may include a head-mounted device is shown in FIG. 2. As shown in FIG. 2, system 8 may have one or more electronic devices 10. Devices 10 may include a head-mounted device (e.g., device 10 of FIG. 1), accessories such as headphones, computing equipment (e.g., a cellular telephone, tablet computer, laptop computer, desktop computer, and/or remote computing equipment that supplies content to a head-mounted device), and/or other devices that communicate with each other.

Each electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

During operation, the communications circuitry of the devices in system 8 (e.g., the communications circuitry of control circuitry 12 of device 10) may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Each device 10 in system 8 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 2, input-output devices 22 may include one or more displays such as displays 14. In some configurations, device 10 includes left and right display devices. Device 10 may, for example, include left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting displays with polymer or semiconductor substrates or display devices based on pixel arrays formed from crystalline semiconductor light-emitting diode dies), liquid crystal display panels, and/or or other left and right display devices that provide images to left and right eye boxes for viewing by the user's left and right eyes, respectively.

During operation, displays 14 may be used to display visual content for a user of device 10. The content that is presented on displays 14 may include virtual objects and other content that is provided to displays 14 by control circuitry 12. This virtual content may sometimes be referred to as computer-generated content. Computer-generated content may be displayed in the absence of real-world content or may be combined with real-world content. In some configurations, a real-world image may be captured by a camera (e.g., a forward-facing camera, sometimes referred to as a front-facing camera) so that computer-generated content may be electronically overlaid on portions of the real-world image (e.g., when device 10 is a pair of virtual reality goggles).

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors (e.g., strain gauges, capacitive force sensors, resistive force sensors, etc.), sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes, lasers, and other light sources (e.g., light-emitting devices that emit light that illuminates the environment surrounding device 10 when ambient light levels are low), speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have head-mounted support structures such as head-mounted support structure 26 (e.g., head-mounted housing structures such as housing walls, straps, etc.). The head-mounted support structure may be configured to be worn on a head of a user (e.g., against the user's face covering the user's eyes) during operation of device 10 and may support displays 14, sensors 16, other components 24, other input-output devices 22, and control circuitry 12 (see, e.g., components 40 and optical module 36 of FIG. 1).

Figure 3:
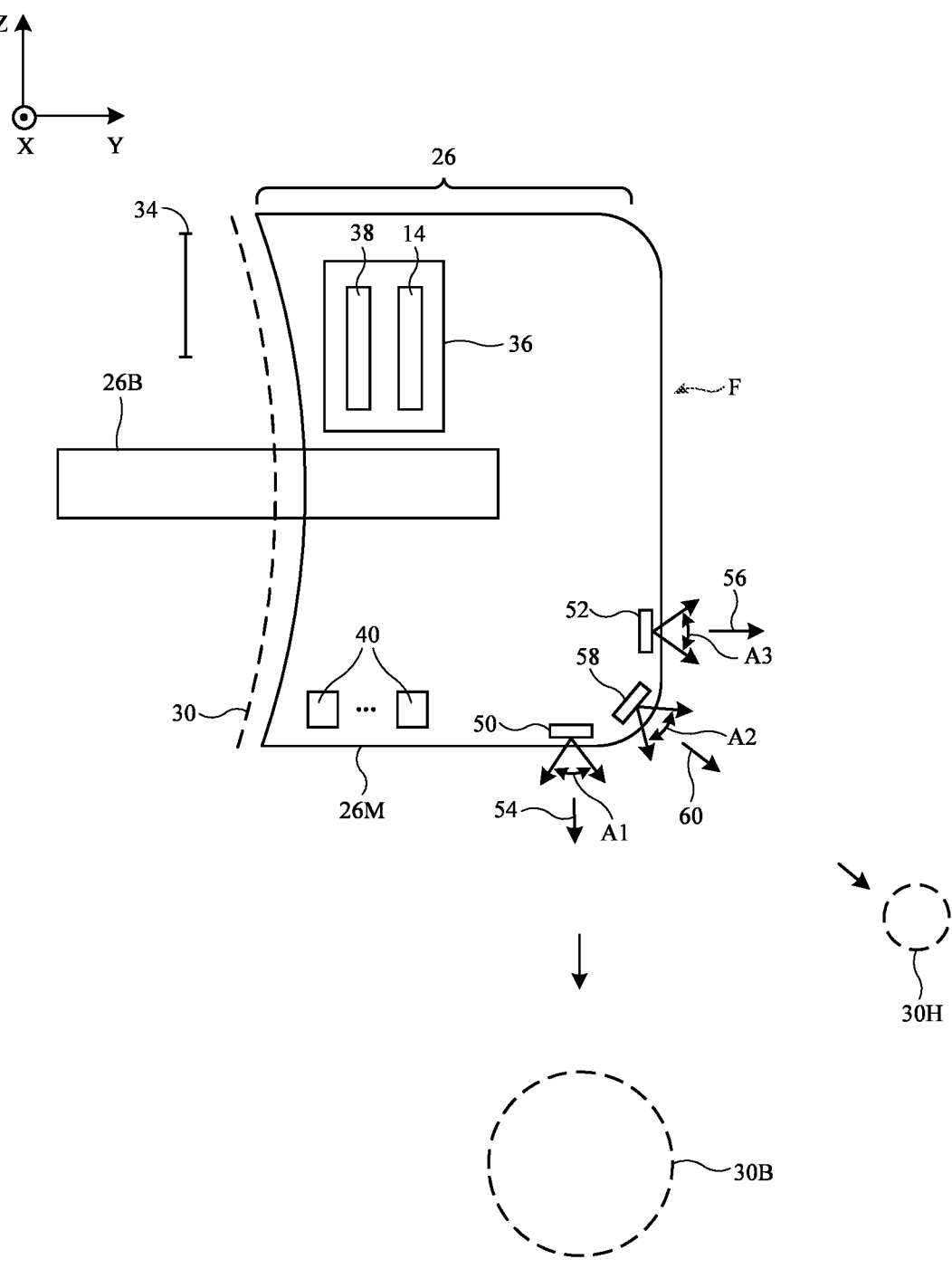
FIG. 3 is a cross-sectional side view of a portion of an illustrative electronic device with an environmental illumination system in accordance with an embodiment.

FIG. 3 is a cross-sectional side view of a head-mounted device in an illustrative configuration in which the device includes an illumination system for providing environmental illumination. Head-mounted device 10 of FIG. 3 may have optical sensors. These sensors may include cameras. The cameras of device 10 may have lenses and image sensors that are configured to capture images at ultraviolet light wavelengths, visible light wavelengths, and/or infrared wavelengths.

Some cameras (e.g., cameras of the type that may sometimes be referred to as scene cameras) may be used for capturing images of a user's environment that are displayed on displays 14 in real time (e.g., real-time pass-through video). Cameras in device 10 may also be used in tracking the positions and movements of external objects. As an example, tracking cameras may track a user's hand (see, e.g., hand 30H) or the user's torso or other body part (see, e.g., user body part 30B). Hand gesture input may, as an example, be used in controlling operation of device 10. Body part monitoring may be used to allow a user's body motions to be replicated by content displayed in a virtual environment. If desired, cameras may also be used in tracking the position of external accessories (e.g., the position and movement of controllers that are moved by a user to control device 10). In some scenario, visual inertial odometry (VIO) systems or other systems that determine the position, movement, and/or orientation of device 10 relative to the environment surrounded by device 10 may be formed by combining data from one or more cameras in device 10 with additional sensor data (e.g., data from an inertial measurement unit). Cameras may perform dedicated functions (tracking, visual inertial odometry functions, scene capture, ranging, three-dimensional image capture for facial recognition and environment mapping, etc.) or two or more of these operations may be performed by a shared camera.

It may be desirable to allow a user of device 10 to operate device 10 in low lighting conditions. As an example, a user may be viewing content on displays 14 while in a dark room or dark vehicle interior. To ensure that camera tracking functions such as hand tracking, body tracking, accessory tracking, and optionally other camera-based functions (e.g., visual inertial odometry, etc.) can be performed satisfactorily, device 10 may provide supplemental illumination. The supplemental illumination may be provided by light sources that produce supplemental ultraviolet light, supplemental visible light, and/or supplemental infrared light to augment any ambient light that is available. In an illustrative configuration, supplemental illumination is provided at infrared wavelengths, as this light is detectable by tracking cameras or other cameras with infrared sensing capabilities and is invisible to the human eye. Because supplemental infrared illumination is invisible, people in the vicinity of the user of device 10 (e.g., people in the same room or vehicle as the user) will not be disturbed by the presence of the supplemental illumination.

Any suitable light sources may be used in forming the supplemental illumination system for device 10 (e.g., light-emitting didoes, lasers, etc.). In an illustrative configuration, these light-emitting devices are laser diodes or light-emitting diodes that emit infrared light at a wavelength of 940 nm or other infrared wavelength (e.g., one or more wavelengths such as 740-1500 nm, at lease 800 nm, 940 nm, at least 900 nm, 800-1200 nm, 900-1000 nm, 750-1100 nm, 800-1100 nm, less than 1500 nm, etc.). There may be N cameras that use supplemental illumination in device 10 and M supplemental light sources. The values of N and M may be 1-10, at least 2, at least 3, at least 4, at least 6, at least 8, 2-10, 4-6, 2-4, less than 10, less than 5, less than 4, or other suitable values. The value of N may be larger than the value of M, the value of N may be equal to the value of M, or the value of N may be less than the value of M. As one example, there may be four cameras that use supplemental infrared illumination and there may be two light sources that emit supplemental illumination.

The cameras that use the supplemental infrared illumination may be configured to be sensitive at the wavelengths illuminated by the supplemental illumination system (e.g., the infrared light wavelengths associated with the M supplemental light sources). The cameras may also be sensitive at visible light wavelengths so that when ample visible ambient light illumination is present, the cameras can operate without any supplemental illumination. To help avoid infrared interference during normal ambient lighting conditions, the supplemental illumination system may, as an example, be configured to emit light in a narrow infrared band (e.g., 940 nm) and the cameras may be provided with filters that pass visible light while blocking all infrared light except light in the narrow infrared band. In another illustrative configuration, the cameras are sensitive across the visible spectrum (e.g., 380 to 740 nm) and into the infrared spectrum (e.g., 740-1000 nm, or other suitable broader infrared wavelength band in which the infrared supplemental illumination is produced). If desired, switchable filters may be sued to block infrared light from the cameras when supplemental infrared illumination is not being used and that pass infrared light when supplemental infrared illumination is being used.

As shown in FIG. 3, the right-hand side of device 10 may contain a first camera such as camera 50 that faces in a direction such as direction 54 (e.g., in the −Z direction and slightly in the +Y direction as an example) and may contain a second camera such as camera 52 (sometimes referred to as a forward-facing camera) that faces in a forward direction such as direction 56 (e.g., in the +Y direction and slightly in the −Z direction as an example). The left-hand side of device 10 may have a corresponding pair of cameras that are oriented in the same way. The angles of view of the cameras on the left and right sides may be configured to overlap in front of device 10, so that there are no gaps in coverage in front of the user. If desired, cameras 50 and 52 may be replaced by a single camera (e.g., a camera in the position of camera 52, a camera in the position of camera 50, or a camera in another suitable forward-facing and/or downward-facing orientation that captures images while viewing outwardly from a location on front side F of device 10). There may be, for example, a single tracking camera (e.g., camera 52) on the right side of device 10 and a corresponding single tracking camera on the left side of device 10.

Regardless of the number of tracking cameras provided on each side of device 10, there may be a right-hand infrared light source such as light source 58 that provides supplemental illumination (infrared light) in direction 60 to illuminate objects such as hand 30H, body 30B, and other external objects for the tracking camera(s) on the right-hand side of device 10 and there may be a corresponding left-hand infrared light source that provides supplemental infrared light for the tracking camera(s) on the left side of device 10. The use of a single supplemental infrared light source on each side of device 10 to provide supplemental illumination for the tracking camera(s) on that side of device 10 may help to conserve space within the tight confines of housing 26.

The supplemental illumination system of device 10 may provide infrared illumination in an area (range of angles) that is larger than the area (range of angles) covered by the tracking camera(s) of device 10, that is equal in area to the area covered by the camera(s), or that is smaller than the area covered by the camera(s).

Consider, as an example the coverage of the supplemental illumination system of device 10 of FIG. 3 within the YZ plane. As shown in the side view of FIG. 3, downward-facing camera 50 may be characterized by an angle of view A1 in the YZ plane and forward-facing camera 52 may be characterized by an angle of view A3 in the YZ plane. These angles of view may overlap to provide continuous tracking coverage in the YZ plane. If desired, the same amount of coverage in the YZ plane or another suitable amount of coverage may be provided using a single tracking camera. The example of FIG. 3 is illustrative.

Supplemental illumination from light source 58 may be characterized by an illumination angle A2 in the YZ plane. The value of A2 may be larger than, equal to, or smaller than the combined angle-of-view of cameras 50 and 52 or may be larger than, equal to, or smaller than the angle-of-view of a single tracking camera being used in place of cameras 50 and 52. In an illustrative configuration, A2 is smaller than the overall angle of view of the tracking camera(s) and is directed outwardly in a forward and downward direction in front of device 10 (where hand and body tracking is most likely to take place). The use of a somewhat reduced illumination area for the supplemental illumination system (e.g., an area of illumination that is less than the area covered by the tracking camera system) may help to conserve power when operating for extended periods of time in dark operating environments while preserving the ability to track objects in all but peripheral areas.

Figure 4:
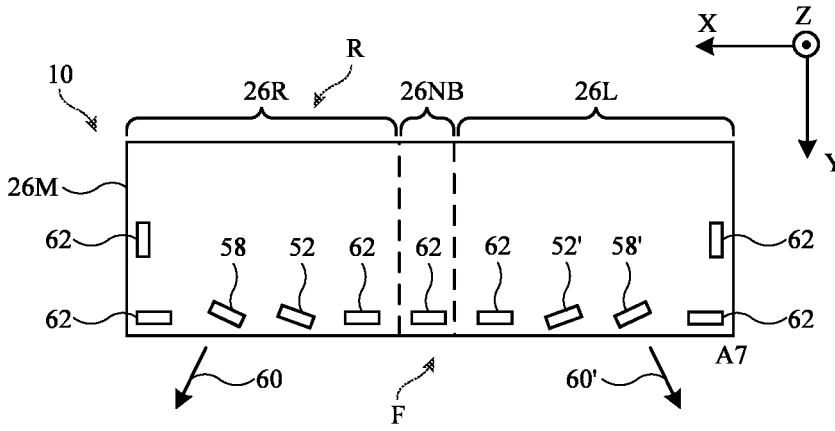
FIG. 4 is a top view of an illustrative electronic device with an environmental illumination system in accordance with an embodiment.

FIG. 4 is a top view of device 10 showing how device 10 may contain cameras on both the left and right sides of support structure 26. The center of housing portion 26M may contain nose bridge portion 26NB. Nose bridge portion 26NM may have a lower edge with a curved shape configured to rest on a user's nose while device 10 is worn on user's face. Nose bridge portion 26NB may couple right housing portion 26R to left housing portion 26L. Optical components 62 may include side-facing visible light cameras, forward-facing visible light cameras, a time-of-flight camera (e.g., a time-of-flight sensor in nose bridge portion 26NM that faces forward), three-dimensional structured light cameras (e.g., left and right structured light cameras adjacent to nose bridge portion 26NB), a flicker sensor for detecting ambient light fluctuations (e.g., 60 Hz fluctuations associated with indoor artificial lighting), an ambient light sensor, etc.

Right camera 52 may be supported in right housing portion 26R and corresponding left camera 52' may be supported in left housing portion 26L. Similarly, an optional additional right camera such as camera 50 of FIG. 3 may be supported in right housing portion 26R and a corresponding optional additional left camera may be supported in left housing portion 26L. In this type of configuration, supplemental illumination for the single right-side tracking camera or the pair of right side tracking cameras may be provided by right supplemental light source 58 and supplemental illumination for the left side camera(s) may be provided by left supplemental light source 58'.

During supplemental illumination operations, light sources 58 and 58' produce supplemental illumination in directions 60 and 60', respectively. As described in connection with the relative coverage areas of the cameras and light source of FIG. 3, it is not necessary for the illumination coverage area of the supplemental illumination system to exactly match the coverage area of the cameras. For example, the tracking cameras on each side of device 10 may be characterized by an angle of view that is larger in the XY plane than the angle of coverage of the associated light source. Arrangements in which the illumination from the supplemental light source on each side of device 10 is provided over the same range of angles as the angle of view of the cameras or in which the illumination is provided over a wider range of angles than the cameras' angle-of-view may also be used.

Supplemental illumination may be provided over a relatively large fixed area in a global fashion or a desired area may be covered by activating or moving a narrower beam of illumination towards or across the desired area. If desired, a dynamic illumination system with a steered or addressable beam of supplemental illumination may steer or activate the illumination beam so that the beam follows a user's hand or other object of interest. In this way, power is not needlessly expended illuminating areas that do not contain objects to track.

Figures 5, 6, 7, 8:
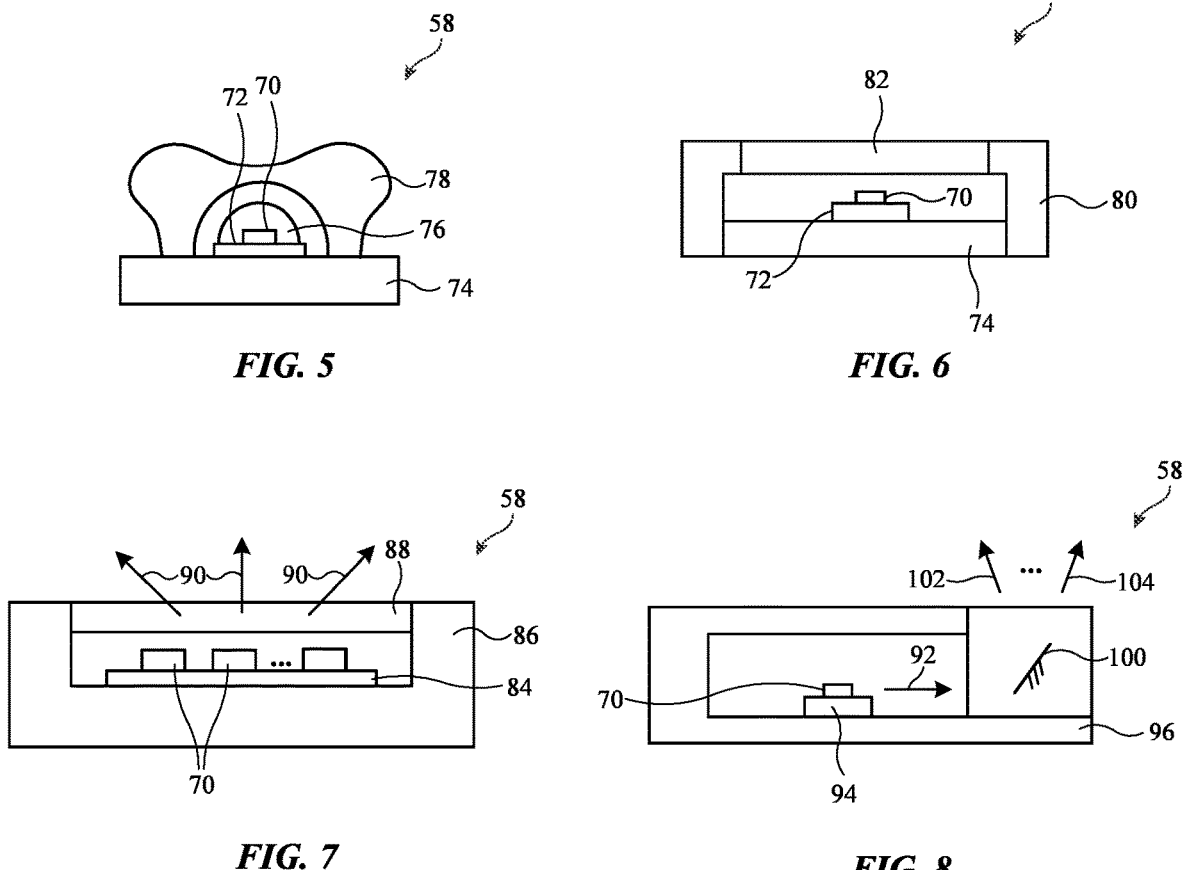
FIGS. 5, 6, 7, and 8 are cross-sectional side view of illustrative light sources for a supplemental illumination system in accordance with an embodiment.

FIGS. 5 and 6 are side views of illustrative fixed-area supplemental illumination light sources.

Illustrative light source 58 of FIG. 5 has a semiconductor light-emitting device 70. Device 70 may be a solid state light-emitting device such as a light-emitting diode, a super-luminous light-emitting diode, a resonant cavity light-emitting diode, an edge-emitting light-emitting diode, or a vertical-cavity-surface-emitting diode, may be a diode-pumped laser such as a diode-pumped fiber laser or other diode-pumped laser, etc. As shown in FIG. 5, device 70 may be mounted on optional interposer 72 (e.g., using solder). Interposer 72 may be mounted to package substrate 74 (e.g., a printed circuit). During operation, device 70 may emit infrared light that is spread over a desired illumination area by one or more optical structures that overlap device 70. In the example of FIG. 5, these optical structures include optional overmolded polymer lens 76 and optional secondary optical structures such as peanut lens 78. It is also possible to form curved reflective optical structures on interposer 76 or substrate 74 to enhance side and/or back light recollection. The optical structures that overlap device 70 may be used to shape the light intensity to produce a desirable far-field distribution different than the native light source intensity distribution (e.g., a light-emitting diode with a Lambertian intensity distribution). If desired, safety enhancement structures such as resistive safety traces or capacitive traces may be embedded in optics or may overlap optics or a photodetector may be used to form a closed loop with a safety interlock on light-source drivers (e.g., in connection with module architectures of the types shown in connection with FIGS. 5-8).

In the illustrative configuration of FIG. 6, light-emitting device 70 (e.g., a laser) has been mounted under a light spreading structure such as beam shaping layer 82. Layer 82 may be supported in light source package 80. Device 70 may be mounted in package 80 on optional interposer 72 on a printed circuit or other substrate. During operation, device 70 of FIG. 6 may emit infrared light in an upward direction that is spread out laterally by beam shaping layer 82 to cover a desired illumination area (e.g., +/−60° or other suitable range of angles).

In general, any suitable optical components that serve as light spreading structures may overlap device 70 of FIGS. 5 and 6. These optical components may include optical components such as refractive beam shaping optical components, diffractive optics, diffusive optics, optical nanostructures (e.g., thin two-dimensional metamaterial layers such as patterned structures of clear dielectric with subwavelength dimensions that form metasurfaces that are configured to spread the emitted beam), curved reflectors, etc. Multiple devices 70 may be mounted in a common package and/or multiple packaged devices 70 may be mounted on a printed circuit adjacent to each other when forming light source 58. The use of a single light-emitting device 70 in forming light source 58 in the examples of FIGS. 5 and 6 is illustrative.

FIGS. 7 and 8 are side views of illustrative dynamic pattern illuminators that may be used in an illumination system for device 10. Using light source of the types shown in FIGS. 7 and 8, control circuitry 12 can selectively activate or steer an emitted beam of infrared light so that one or more objects of interest can be provided with targeted supplemental illumination.

In the example of FIG. 7, light source 58 has an array of light-emitting devices 70. Devices 70 may include multiple semiconductor dies mounted on a substrate such as printed circuit 84 in package 86, may include multiple individually addressable emitters, or may include multiple individually addressable segments of emitters mounted on a substrate such as silicon, ceramic, printed circuit board 84, or other substrate in package 86. A zoned beam shaper layer or other optical component such as layer 88 may overlap devices 70. Layer 88 may have multiple zones each with a respective beam steering and beam shaping optical structure. These structures may be refractive structures, diffractive structures, nanostructures, etc. Structures on both surfaces of layer 88 and/or multiple layers of layer 88 with vertically aligned or misaligned zones may be employed. Each zone may be used to steer and shape a beam of light emitted from a respective light-emitting device in a different respective direction. For example, a first zone may direct a beam of light that has been emitted vertically from a first device 70 to the left, whereas a second zone may direct a beam of light that has been emitted vertically from a second device 70 to the right. By overlapping an array of individually controlled devices 70 with a corresponding array of individualized beam steering structures, each device 70 can be configured to emit a beam of light in a different respective direction (see, e.g., illustrative beams 90), providing light source 58 of FIG. 7 with the ability to emit a steered beam of light. The emission area of each beam may overlap with adjacent beams to avoid potential gaps in coverage. Beams 90 may all be emitted simultaneously or one or more selected beams 90 may be emitted at a time. If desired, beams 90 may be emitted in sequence (e.g., to scan the emitted beam from light source 58 across an area of interest).

Another illustrative light source that may be used in forming a dynamic pattern illuminator for the supplemental illumination system of device 10 is shown in FIG. 8. Light source 58 of FIG. 8 may have one or more light-emitting devices such as device 70 that emit one or more beams of light such as light beam 92 (e.g., an infrared light beam). Device 70 may be mounted on a printed circuit or other substrate 94 in package 96. Electrically controlled beam steerer 98 may have one or more beam steerers such as steerable microelectromechanical systems mirror 100 or other electrically adjustable beam steering element(s) controlled by control signals from control circuitry 12. When it is desired to emit light in a first direction, mirror 100 may be placed in a first orientation that reflects beam 92 to create first emitted beam 102. When it is desired to emit light in a second direction, mirror 100 may be placed in a second orientation that is different than the first orientation, thereby reflecting beam 92 to create second emitted beam 104. Mirror 100 may be placed in any suitable number of different orientations (e.g., at least 2, at least 10, at least 25, at least 100, less than 5000, less than 1000, less than 500, or other suitable number). Mirror 100 may be rotated about a single axis (to change the angle of emitted light beams along a single dimension) or may be rotated about two axes (e.g., to change the angle of emitted light beams arbitrarily in two dimensions). If desired, beam shaping optics (e.g., beam collimating lenses, etc.) may be incorporated into beam steerer 98 to help ensure that the steered beam has a desired intensity profile.

If desired, a hybrid illuminator architecture may be employed, such that multiple channels of device 70 or multiple devise 70 as described in connection with FIG. 7 can be selectively activated to provide one or more additional dimensions of dynamic illumination to beam steering optics such as mirror 100 of FIG. 8.

Figure 9:
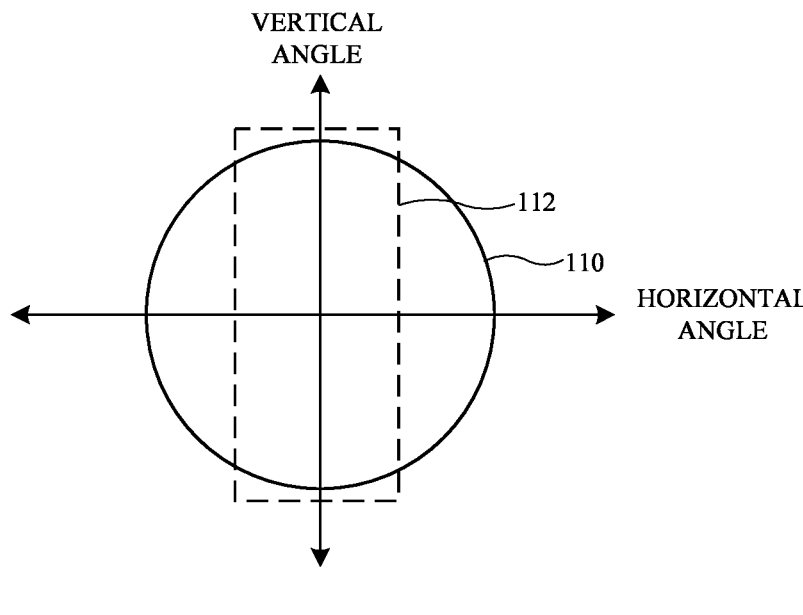
FIGS. 9, 10, and 11 are graphs showing illustrative illumination patterns that may be produced by a supplemental illumination system in accordance with an embodiment.

Light sources that emit static wide-area beams (see, e.g., illustrative light sources 58 of FIGS. 5 and 6) may be configured to emit light beams of any suitable shape to help provide supplemental illumination for the tracking cameras of device 10. FIG. 9 is a graph showing how light source 58 may be configured to emit a circular beam field of regards (FoG) such as circular beam 110 (e.g., a beam of infrared light with full width half maximum (FWHM) intensity characterized by an angular spread of +/−60° or other suitable coverage area) or may be configured to emit a rectangular beam FoG such as rectangular beam 112 with a similar angular spread vertically and a smaller angular spread horizontally. Two rectangular beams such as beam 112 may be produced side by side to provide sufficient horizontal illumination coverage for both the left and right cameras in device 10 (as an example).

In most general use cases, a goal of the illumination system is to provide a uniform signal-to-noise ratio for the illuminated scene captured by one or more cameras. Within the desired FWHM 2-D FoG, a uniform far-field intensity at each instantaneous FoG (iFoG) can be achieved to provide uniform illumination and working range for the cameras. However, there are cases when non-uniform far-field intensity distributions may be desired. For example, when a target of the illumination is flat or when camera vignetting is significant, a symmetric "bat-wing" intensity distribution may be used to compensate for the relative intensity fall-off of the camera image sensor. Further examples include asymmetric intensity distribution for cameras that are aligned with a non-co-axial orientation relative to the illumination system, for targets sch as hands that have asymmetric occurrence/residence across FoGs, for multiple illuminators with overlapping FoGs, for multiple non-co-axial cameras, for irregular occlusions at certain FoG regions, etc.

Figure 10:
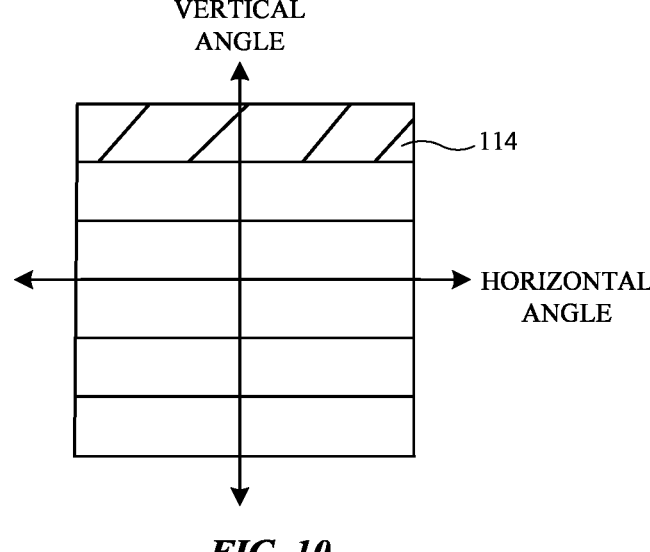
Figure 11:
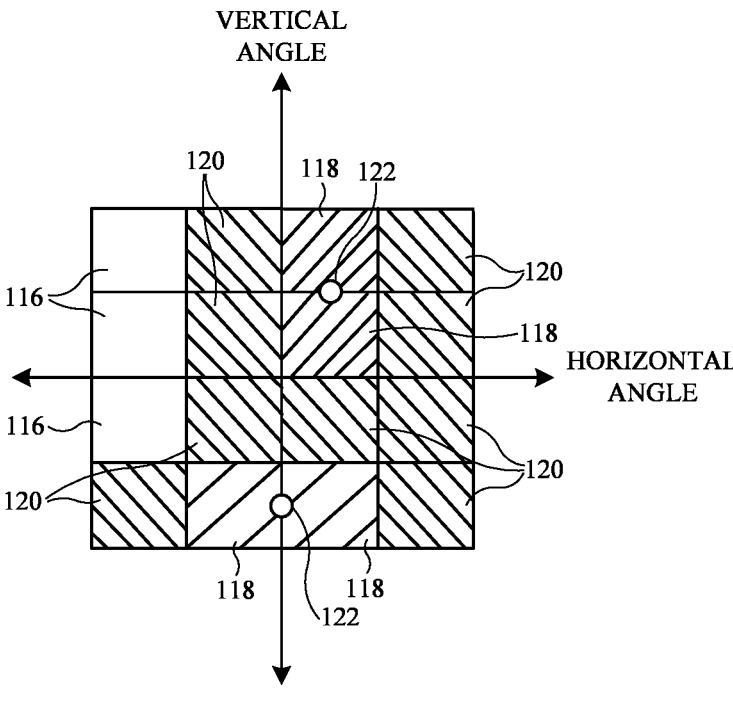

The graphs of FIGS. 10 and 11 show illustrative beam outputs (angular beam distributions) associated with a dynamically adjustable illumination system. In the example of FIG. 10, a light source such as light source 58 of FIG. 58 of FIG. 7 or light source 58 of FIG. 8 has been configured to produce a beam with an elongated rectangular shape (e.g., a rectangle having a larger horizontal spread than vertical spread). Using beam steering, light source 58 may emit this elongated rectangular beam in one or more vertical locations, such as illustrative location 114 of FIG. 10. In an arrangement of the type shown in FIG. 7, each light-emitting device 70 may produce a different respective elongated rectangular beam each of which is associated with a different vertical position in the output of light source 58. One or more of these beams may be emitted at the same time by turning on one or more respective light-emitting devices 70. In an arrangement of the type shown in FIG. 8, light-emitting device 70 may produce a beam such as beam 92 of FIG. 8 that is steered to a desired location (e.g., illustrative location 114 of FIG. 10) and/or to other locations by beam steerer 98, thereby providing a desired coverage for light source 58.

In the illustrative example of FIG. 10, light is output over a larger vertical angular range than horizontal range. Additional horizontal coverage may be supplied using an additional light source (e.g., a light source on an opposing side of device 10). In this way, a desired angular output range (e.g., +/−60° in both horizontal and vertical dimensions or other suitable angular output range) may be covered.

In the illustrative configuration of FIG. 11, light source 58 (e.g., a dynamically configured light source such as light source 58 of FIG. 7 or FIG. 8) is configured to supply a relatively small circular or square output beam that can be steered in both horizontal and vertical dimensions so that a desired overall amount of coverage is produced.

In both those light sources that are static and do not have steerable beams and in those light sources with dynamically patterned output, beam power can be controlled in a binary fashion (on/off) or in an analog fashion (e.g., by adjusting output power continuously or in a stepwise fashion between more than two different output levels). As shown in FIG. 11, for example, no light may be output in certain portions of a coverage area such as areas 116 (e.g., beam power may be zero for these areas), full power light may be output in areas such as areas 118 (e.g., beam power may be maximized for these areas), and an intermediate power level may be used when supplying output light to other areas such as areas 120 that are immediately adjacent to areas 118.

Arrangements in which full-power light is only output in a subset of the total coverage area for light source 58 may help device 10 use power efficiently. As shown in the diagram of FIG. 11, for example, there may be one or more external objects of interest such as objects 122 within the coverage area of a given light source. Device 10 may, as an example, be tracking a user's hands or other external objects. When these objects are relatively small compared to the overall angle-of-view of the cameras in device 10, power can be conserved by restricting the output of supplemental illumination (or at least restricting the output of full-power supplemental illumination) to only those regions that overlap the tracked external objects.

In the FIG. 11 example, objects 122 (e.g., the user's hands or other body part or other objects in the user's environment) are being actively tracked by device 10. As a result, the supplemental illumination system of device 10 is being used to provide full-power illumination to areas 118 that overlap objects 122. Elsewhere in the coverage area of light-emitting device 58, beam power is reduced (see, e.g., intermediate power areas 120) or shut off entirely (see, e.g., unilluminated areas 116). This type of approach may be used for either scanned beam arrangements (e.g., using a scanning mirror device or other beam steerer as described in connection with FIG. 8) or using light sources with addressable arrays of devices 70 each of which can provide output in different directions (e.g., light source 58 of FIG. 7).

In areas such as areas 116 of FIG. 11, no supplemental illumination is present, so items in those areas will not receive supplemental illumination. Nevertheless, once objects such as objects 122 are being tracked, device 10 can monitor the position and direction of movement of objects 122 in real time. This allows device 10 to provide supplemental illumination of full power to the areas overlapping objects 122 and intermediate power (or, if desired, full power), to portions of the output area of light source 58 that are immediately adjacent to objects 122 (e.g., areas where objects 122 may possibly move and/or are predicted to occupy in the near future based on tracked movements). In the event that the positions of objects 122 move into one of those adjacent areas, device 10 can increase the supplemental illumination on those areas to full power and can update the beam powers so that adjacent areas again have intermediate power level coverage.

Although the multi-power-level beam scheme of FIG. 11 has been described in connection with a two-dimensional scanning light beam from light sources 58 of FIGS. 7 and 8, such adjustable power output schemes may also be used with light sources 58 that provide one-dimensional adjustable direction light sources (e.g., light sources that produce slices of supplemental illumination of the type shown in FIG. 10) and/or may be used with fixed-area light sources. In a fixed-area light source scheme, for example, a right-hand light source 58 of the type shown in FIG. 5 and FIG. 6 may be used to supply supplemental illumination for tracking objects 122 that are in front of the right-hand camera(s) of device 10, whereas a left-hand light source 58 of the type shown in FIG. 5 or FIG. 6 may be used to supply supplemental illumination for tracking objects 122 that are in front of the left-hand camera(s) of device 10. Device 10 can activate either the right-hand light-source or the left-hand light source or both depending on the current and expected locations of objects 122.

Another way in which to help use power efficiently for the supplemental illumination system involves using light sources 58 to produce supplemental illumination only when the cameras for which the supplemental illumination is being provided will benefit from the supplemental illumination. For example, in bright lighting conditions, ambient visible light will provide sufficient illumination, so supplemental infrared light beams can be turned off (or at least reduced in power to a lower level than otherwise used) to help conserve power. The activation of supplemental lighting may take place when dim ambient lighting conditions are detected or when other suitable conditions are detected to trigger the production of supplemental lighting.

FIG. 12 is a flow chart of illustrative operations involved in using electronic device 10.

During the operations of block 150, device 10 may be used to provide a user with content such as visual content, audio content, and other output. Device 10 may, as an example be worn on a user's head while images are presented for viewing. The operations of block 150 may be performed while device 10 is in a normal operating environment with satisfactory visible ambient light levels.

Visual content may be presented for the user on displays 14. This visual content may include camera images from cameras in device 10 (e.g., pass-through video) and/or other content. In some scenarios, computer-generated content (sometimes referred to as virtual content) may be overlaid on top of real-world content from cameras in device 10. In this type of mixed reality environment, camera data may be used to help track the locations of the user's hands and other real-world objects and thereby help register the overlaying of virtual content on real-world images. For example, by tracking the location of a user's hand, a computer-generated image of a glove may be accurately overlaid on top of a real-world image of the user's hand. By tracking the location of a table surface, a computer-generated image may be placed on top of the table surface. Camera data can be used to track the motion of a user's hands, fingers, and/or other body parts in real time. In this way, hand gestures, finger gestures, and/or other body part motions that serve as user input (sometimes referred to as air gestures) can be used in controlling the operation of device 10 (e.g., in a mixed-reality or completely virtual environment).

Device 10 may have any suitable number of cameras including three-dimensional cameras (e.g., structured light cameras, time-of flight cameras, etc.), cameras for capturing real-world visible-light images (e.g., for video passthrough), and/or cameras that perform tracking operations, that serve as parts of visual inertial odometry systems, and/or that otherwise support the operation of device 10. The cameras of device 10 may face forward, down, to the side, up, to the rear, and/or in multiple directions. Some cameras may operate only at visible wavelengths. Other cameras may operate at visible and infrared wavelengths.

As described in connection with FIGS. 3 and 4, device 10 may, as an example, have a one or more tracking cameras on each side of device 10. These cameras may be sensitive at visible and infrared wavelengths and may be used for tracking operations (e.g., hand and body tracking, air gesture input tracking, accessory tracking) and optionally additional functions such as imaging structures in the user's environment for a visual inertial odometry system). Tracking cameras may be sensitive at visible and infrared wavelengths such as wavelengths from 400-1000 nm, 400-740 nm and 940 nm, or other suitable visible and infrared wavelengths. The infrared sensitivity of the tracking cameras preferably coincides with the wavelength or wavelengths emitted by light sources 58 in the supplemental illumination system, allowing these cameras to operate when most or all available illumination is being provided by light sources 58 rather than ambient light sources.

Supplemental illumination may, if desired, be provided continuously. Arrangements in which power is conserved by at least occasionally depowering the supplemental illumination system are described herein as an example. In configurations for device 10 in which supplemental illumination is turned on and off, device 10 may, during the operations of block 150, monitor for the occurrence of conditions indicating that supplemental illumination should be switched on for satisfactory operation of the cameras (e.g., the tracking cameras). These monitoring activities may take place while the cameras of device 10 (e.g., the tracking cameras) are operating normally in the absence of supplemental illumination from the supplemental illumination system.

Any suitable trigger criteria may be used to determine when to activate the supplemental illumination system by turning on light sources 58. As an example, device 10 may contain an ambient light sensor. The ambient light sensor may measure the amount of visible ambient light that is present in the environment surrounding device 10. A threshold or other criteria may be applied to ambient light readings from the ambient light sensor. In response to determining that ambient light levels are below a predetermined ambient light threshold or are otherwise too dim for satisfactory operation of the tracking cameras, control circuitry 12 can turn on light sources 58 to provide supplemental illumination (e.g., infrared light).

Another illustrative criteria that may be used in determining when to activate supplemental illumination involves evaluating an image processing algorithm quality metric. During the operations of bock 150, captured images may be proceed by one or more image processing algorithms. These algorithms may include, as an example, a hand tracking algorithm. The hand tracking algorithm may produce a quality factor or other metric that is indicative of the ability of the hand tracking algorithm to satisfactorily track the user's hands. In response to detecting that the tracking algorithm quality metric is below a desired threshold value, control circuitry 12 can turn on light sources 58 to provide supplemental illumination for the cameras.

If desired, the tracking cameras or other image sensor hardware may supply information indicating that performance is being adversely affected by low ambient lighting levels. As an example, frames of image data may be evaluated to determine whether lighting levels are low. The output of the tracking camera hardware of device 10 may also indicate whether signal-to-noise levels are satisfactory. If the tracking cameras are producing only dark and/or noisy image data, control circuitry 12 can determine that light sources 58 should be turned on.

In some arrangements, device 10 may be configured to determine the location of a user relative to walls and other obstructions in the user's environment. As an example, device 10 may contain a map of known wall locations (e.g., a map obtained from an external source or a map based on previous map-building operations performed by device 10 when a user wore device 10 while walking throughout a building or other environment). Satellite navigation system circuitry (e.g., Global Positioning System circuitry) may use satellite signals to determine the location of device 10 (e.g. the location of device 10 relative to building walls and other obstructions). From the user's known location and movement and using information on the locations of known obstructions such as walls, device 10 can predict when a user is likely to approach a wall or other obstruction. Sensors 16 in device 10 such as proximity sensors, time of flight sensors, radar, lidar, etc.) may also be used in monitoring the user's movements relative to walls and other obstructions. By using some or all of this information in combination with additional information on the operating environment for device 10 (e.g., ambient light readings indicating that ambient lighting is dim), device 10 can determine when light sources 58 should be turned on to provide supplemental illumination to help ensure that the tracking cameras of device 10 will operate satisfactorily. This may help ensure that the cameras of device 10 can track the locations of obstructions in the user's environment using the infrared illumination of light sources 58. By tracking the locations of obstructions accurately, these obstructions or alerts regarding the presence of the obstructions can be displayed on displays 14 to help the user avoid undesired collisions with the obstructions.

If desired, multiple electronic devices 10 in system 8 may monitor for conditions indicating that supplemental illumination is needed. For example, multiple users may be wearing head-mounted devices and one device may detect low levels of ambient lighting before another. In this type of system, any of the devices that detect a low level of ambient lighting can signal the other devices in the system to request that supplemental illumination be provided. In response, one or more of the other devices may provide supplemental illumination to assist the cameras of the requesting device in gathering images. The supplemental illumination systems of different devices may therefore assist each other by contributing shared supplemental illumination. This may allow a wall-powered device to help provide supplemental illumination for a battery powered device or may allow an electronic device that is close to a tracked object to provide supplemental illumination to that object more efficiently than an electronic device that is farther from the tracked object (as examples).

So long as conditions for triggering supplemental illumination are not detected, device 10 (e.g., control circuitry 12) may continue to monitor for conditions that satisfy supplemental illumination trigger criteria (e.g., dim ambient lighting, reduction of tracking camera image processing quality, reduction of camera hardware performance, criteria based on obstruction proximity, requests from other devices, etc.) during the operations of block 150.

In the event that the trigger criteria are satisfied, processing may proceed to block 152. During the operations of block 152, control circuitry 14 can use the supplemental illumination system to provide supplemental illumination for the cameras (e.g., infrared light emitted by light sources 58 that illuminates exterior objects in the field of view of the tracking cameras). In providing the supplemental illumination, the power of the infrared light emitted by each light source 58 and/or the direction of the light beam(s) emitted by each light source 58 may be adjusted. For example, some devices 70 may be turned on while other devices 70 remain off, beams of emitted light may be directed to areas containing tracked objects (e.g., the known locations of the user's hands or other external objects of interest being tracked by the tracking cameras) and/or adjacent areas, emitted power levels may be adjusted in a stepwise fashion or continuously (e.g., so that sufficient supplemental illumination is provided to ensure satisfactory tracking camera operation without providing excess illumination), etc.

Light sources such as light sources 58 of FIGS. 5 and 6 that are configured to provide illumination over a fixed area may be turned on to ensure that objects in those fixed areas are illuminated. Light sources that emit steerable beams such as light sources 58 of FIGS. 7 and 8 may be used to emit supplemental illumination over a relatively large area (e.g. by scanning a beam across the large area or by simultaneously using multiple smaller beams to illuminate different respective parts of the larger area) or may be used to emit supplemental illumination to particular locations such as the location(s) containing the user's hands or other objects being tracked.

Supplemental illumination may be provided for cameras that track user body parts, cameras that track the locations of accessories, cameras that capture pass-through video, cameras that form part of a visual inertial odometry system, and/or other optical components that gather light from objects in the vicinity of device 10. If desired, light sources 58 may be configured to emit structured light (e.g., lines, dots, features distributed in pseudorandom patterns, etc.). Structured light may be used, for example, in scenarios in which the tracking cameras gather three-dimensional images.

During the operations of block 152, device 10 may monitor for conditions that indicate that supplemental illumination is no longer needed. Control circuitry 12 may, for example, monitor to determine whether supplemental illumination trigger conditions cease to be satisfied. So long as dim ambient lighting conditions or other conditions indicating that supplemental illumination should be provided continue to be present, device 10 can continue to use light sources 58 to provide supplemental illumination. In the event that dim lighting conditions cease or that other conditions in which supplemental illumination is desired are determined to no longer be present, device 10 can turn off the supplemental illumination system. In particular, control circuitry 12 can turn off light sources 58 during the operations of block 156. As indicated by line 154, operations may then return to block 150.

In accordance with an embodiment, a head-mounted device is provided that includes a head-mounted support structure; an infrared light source configured to emit infrared light; a camera supported by the head-mounted device that is operable at visible and infrared wavelengths; control circuitry configured to: monitor for illumination trigger conditions; in response to detecting that the illumination trigger conditions are not present, turn off the infrared light source while using the camera to capture a visible light image under visible illumination from visible ambient light; and in response to detecting that the illumination trigger conditions are present, turn on the infrared light source while using the camera to capture an infrared light image under infrared illumination from the infrared light source.

In accordance with another embodiment, the control circuitry is configured to: process image data from the camera to detect an external object; and control the infrared light source to provide the emitted light with a first intensity in an area that overlaps the external object and to provide the emitted light with a second intensity that is less than the first intensity in an area that is adjacent to the externa object.

In accordance with another embodiment, the infrared light source is configured to emit the infrared light in an output direction that is controlled by the control circuitry.

In accordance with another embodiment, the infrared light source includes an electrically adjustable beam steerer.

In accordance with another embodiment, the electrically adjustable beam steerer has a mirror controlled by the control circuitry.

In accordance with another embodiment, the infrared light source includes an array of light-emitting devices and each light-emitting device is configured to emit a beam of light in a different direction.

In accordance with another embodiment, the infrared light source includes an infrared light-emitting diode overlapped by a lens.

In accordance with another embodiment, the infrared light source includes a beam shaping layer and a laser overlapped by the beam shaping layer.

In accordance with another embodiment, light source is configured to provide adjustable amounts of illumination in a plurality of respective areas, the control circuitry is configured to use data from the camera to track an object, and the control circuitry is configured to adjust the light source to emit more illumination in a first of the areas that overlaps the object than in a second of the areas that does not overlap the object.

In accordance with another embodiment, the camera is configured to track an object, the light source is an adjustable light source that emits beams of the infrared light over an area, and the control circuitry is configured to use the light source to illuminate a first part of the area which contains the object without illuminating a second part of the area which does not contain the object.

In accordance with another embodiment, the object includes a hand, the head-mounted device includes an ambient light sensor, the illumination trigger conditions include dim ambient lighting conditions detected by the ambient light sensor, and the control circuitry is configured to process image data from the camera to track movement of the hand.

In accordance with another embodiment, the control circuitry is configured to implement an image processing algorithm that processes image data from the camera and the illumination trigger conditions include a quality metric associated with the image processing algorithm falling below a predetermined threshold.

In accordance with another embodiment, the control circuitry is configured to turn on the infrared light source based on output from the camera.

In accordance with another embodiment, the control circuitry is configured to turn on the infrared light source based on location information.

In accordance with an embodiment, a head-mounted device is provided that includes a head-mounted support structure; a left lens on a left side of the head-mounted support structure; a right lens on the right side of the head-mounted support structure; left and right displays configured to provide respective left and right rear images viewable from left and right eye boxes through the left and right lenses; a left infrared light source on the left side of the head-mounted support structure; a right infrared light source on the right side of the head-mounted support structure; and left and right cameras supported respectively on the left and right sides of the head-mounted support structure, the left and right cameras are configured to capture visible light images in first ambient lighting conditions and are configured to capture infrared images in second ambient lighting conditions, the second ambient lighting conditions are characterized by less visible ambient light than the first ambient lighting conditions, and the left and right infrared light sources are configured to provide supplemental infrared illumination when the second ambient lighting conditions are present.

In accordance with another embodiment, the head-mounted device includes control circuitry configured to turn on the left infrared light source without turning on the right infrared light source.

In accordance with another embodiment, the first and second infrared light sources are each configured to emit infrared light in adjustable patterns.

In accordance with another embodiment, the head-mounted device includes an additional left camera and an additional right camera, the left and right cameras and the additional left and right cameras are configured to track an object.

In accordance with an embodiment, a head-mounted device is provided that includes a head-mounted support structure; displays in the head-mounted support structure configured to display images to eye boxes; a supplemental illumination system that is supported by the head-mounted support structure and is configured to emit infrared light; a tracking camera that is configured to capture images of an external object to track the external object; an ambient light sensor; and control circuitry configured to: measure an ambient light level using the ambient light sensor; turn on the supplemental illumination system to provide a beam of supplemental infrared illumination for the tracking camera in response to detecting that the measured ambient light level is below a threshold; and adjust the supplemental illumination system while tracking the external object to steer the beam of supplemental infrared illumination towards the external object.

In accordance with another embodiment, the supplemental illumination system includes a light source selected from the group consisting of: a light source with only a single infrared light-emitting component, a light source with an array of infrared light-emitting components each configured to emit light in a different direction, and an infrared light source with an electrically adjustable beam steerer.

The foregoing is merely illustrative and various modifications can be made to the described embodiments. The foregoing embodiments may be implemented individually or in any combination.

What is claimed is:

1. A head-mounted device, comprising:
a head-mounted support structure;
an infrared light source configured to emit infrared light, wherein the infrared light source is an adjustable light source that emits beams of the infrared light over an area;
a camera supported by the head-mounted device that is operable at visible and infrared wavelengths, wherein the camera is configured to track an object;
control circuitry configured to:
monitor for illumination trigger conditions;
in response to detecting that the illumination trigger conditions are not present, turn off the infrared light source while using the camera to capture a visible light image under visible illumination from visible ambient light; and
in response to detecting that the illumination trigger conditions are present, turn on the infrared light source while using the camera to capture an infrared light image under infrared illumination from the infrared light source, wherein the control circuitry is configured to use the infrared light source to illuminate a first part of the area which contains the object without illuminating a second part of the area which does not contain the object.

2. The head-mounted device defined in claim 1 wherein the control circuitry is configured to:
process image data from the camera to detect an external object; and
control the infrared light source to provide the emitted light with a first intensity in an area that overlaps the external object and to provide the emitted light with a second intensity that is less than the first intensity in an area that is adjacent to the external object.

3. The head-mounted device defined in claim 1 wherein the infrared light source is configured to emit the infrared light in an output direction that is controlled by the control circuitry.

4. The head-mounted device defined in claim 3 wherein the infrared light source comprises an electrically adjustable beam steerer.

5. The head-mounted device defined in claim 4 wherein the electrically adjustable beam steerer has a mirror controlled by the control circuitry.

6. The head-mounted device defined in claim 3 wherein the infrared light source comprises an array of light-emitting devices and wherein each light-emitting device is configured to emit a beam of light in a different direction.

7. The head-mounted device defined in claim 1 wherein the infrared light source comprises an infrared light-emitting diode overlapped by a lens.

8. The head-mounted device defined in claim 1 wherein the infrared light source comprises a beam shaping layer and a laser overlapped by the beam shaping layer.

9. The head-mounted device defined in claim 1 wherein the infrared light source is configured to provide adjustable amounts of illumination in a plurality of additional areas and wherein the control circuitry is configured to adjust the infrared light source to emit more illumination in a first of the additional areas that overlaps the object than in a second of the additional areas that does not overlap the object.

10. The head-mounted device defined in claim 1 wherein the object comprises a hand, the head-mounted device further comprising an ambient light sensor, wherein the illumination trigger conditions comprise dim ambient lighting conditions detected by the ambient light sensor, and wherein the control circuitry is configured to process image data from the camera to track movement of the hand.

11. The head-mounted device defined in claim 1 wherein the control circuitry is configured to implement an image processing algorithm that processes image data from the camera and wherein the illumination trigger conditions comprise a quality metric associated with the image processing algorithm falling below a predetermined threshold.

12. The head-mounted device defined in claim 1 wherein the control circuitry is configured to turn on the infrared light source based on output from the camera.

13. The head-mounted device defined in claim 1 wherein the control circuitry is configured to turn on the infrared light source based on location information.

14. A head-mounted device, comprising:
a head-mounted support structure;
a left lens on a left side of the head-mounted support structure;
a right lens on the right side of the head-mounted support structure;
left and right displays configured to provide respective left and right rear images viewable from left and right eye boxes through the left and right lenses;
a left infrared light source on the left side of the head-mounted support structure;
a right infrared light source on the right side of the head-mounted support structure;
left and right cameras supported respectively on the left and right sides of the head-mounted support structure, wherein the left and right cameras are configured to capture visible light images in first ambient lighting conditions and are configured to capture infrared images in second ambient lighting conditions, wherein the second ambient lighting conditions are characterized by less visible ambient light than the first ambient lighting conditions, and wherein the left and right infrared light sources are configured to provide supplemental infrared illumination when the second ambient lighting conditions are present; and
control circuitry configured to turn on the left infrared light source without turning on the right infrared light source.

15. The head-mounted device defined in claim 14 wherein the left and right infrared light sources are each configured to emit infrared light in adjustable patterns.

16. The head-mounted device defined in claim 14 further comprising an additional left camera and an additional right camera, wherein the left and right cameras and the additional left and right cameras are configured to track an object.

17. A head-mounted device comprising:
a head-mounted support structure;
displays in the head-mounted support structure configured to display images to eye boxes;
a supplemental illumination system that is supported by the head-mounted support structure and is configured to emit infrared light;
a tracking camera that is configured to capture images of an external object to track the external object;
an ambient light sensor; and
control circuitry configured to:
measure an ambient light level using the ambient light sensor;
turn on the supplemental illumination system to provide a beam of supplemental infrared illumination for the tracking camera in response to detecting that the measured ambient light level is below a threshold; and
adjust the supplemental illumination system while tracking the external object to steer the beam of supplemental infrared illumination towards the external object.

18. The head-mounted device defined in claim 17 wherein the supplemental illumination system comprises a light source selected from the group consisting of: a light source with only a single infrared light-emitting component, a light source with an array of infrared light-emitting components each configured to emit light in a different direction, and an infrared light source with an electrically adjustable beam steerer.

19. The head-mounted device defined in claim 17 wherein the supplemental illumination system comprises an infrared light source with an electrically controlled beam steerer.

20. The head-mounted device defined in claim 17 wherein the supplemental illumination system comprises an array of infrared light-emitting components overlapped by an array of beam steering structures.

* * * * *